United States Patent
Ohno et al.

(10) Patent No.: US 7,051,057 B2
(45) Date of Patent: May 23, 2006

(54) GENERAL-PURPOSE FUNCTIONAL CIRCUIT AND GENERAL-PURPOSE UNIT FOR PROGRAMMABLE CONTROLLER

(75) Inventors: Koji Ohno, Osaka (JP); Hideki Noda, Osaka (JP); Kazuhiro Mishina, Osaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 251 days.

(21) Appl. No.: 10/415,652

(22) PCT Filed: Nov. 28, 2001

(86) PCT No.: PCT/JP01/10350

§ 371 (c)(1),
(2), (4) Date: May 7, 2003

(87) PCT Pub. No.: WO02/44821

PCT Pub. Date: Jun. 6, 2002

(65) Prior Publication Data

US 2004/0024799 A1  Feb. 5, 2004

(30) Foreign Application Priority Data

Nov. 30, 2000 (JP) .............................. 2000-366388
Jan. 26, 2001 (JP) .............................. 2001-018495

(51) Int. Cl.
*G06F 3/00* (2006.01)

(52) U.S. Cl. ............................ 708/139; 700/2; 700/19; 700/20; 710/11; 710/14; 709/217; 709/220; 709/223; 709/224; 709/225

(58) Field of Classification Search .................. 700/2, 700/19–20; 710/11, 14; 709/217, 220, 223–225; 708/139

See application file for complete search history.

(56) References Cited

U.S. PATENT DOCUMENTS

| 4,498,151 | A | | 2/1985 | Henry |
| 5,475,583 | A | | 12/1995 | Bock et al. |
| 5,731,712 | A | * | 3/1998 | Welch ..................... 326/41 |
| 5,819,050 | A | | 10/1998 | Boehling et al. |
| 5,978,593 | A | * | 11/1999 | Sexton ..................... 710/1 |
| 6,745,090 | B1 | * | 6/2004 | Malizia, Jr. .............. 700/65 |
| 2001/0034830 | A1 | * | 10/2001 | Seki et al. .................. 713/1 |

FOREIGN PATENT DOCUMENTS

| EP | 0434288 | 6/1991 |
| EP | 0620510 | 10/1994 |

* cited by examiner

OTHER PUBLICATIONS

English Language Abstract of EP 0 620 510.

*Primary Examiner*—Anthony Knight
*Assistant Examiner*—Ronald D Hartman, Jr.
(74) *Attorney, Agent, or Firm*—Greenblum & Bernstein, P.L.C.

(57) ABSTRACT

A general-purpose functional circuit for a programmable controller, comprising: an external connector which is connected to an external appliance to be controlled; an interconnecting connector which is connected to at least a CPU unit of the programmable controller; and an arithmetic processing member which has at least a function of transmitting to and receiving from the external appliance connected to the arithmetic processing member through the external connector, signals and performing a logical operation based on an external signal received from the external appliance so as to transmit to the CPU unit via the interconnecting connector, a logical operation signal corresponding to a result of the logical operation; wherein the CPU unit includes a CPU for executing a sequence program.

14 Claims, 9 Drawing Sheets

GENERAL-PURPOSE FUNCTIONAL CIRCUIT AND GENERAL-PURPOSE UNIT FOR PROGRAMMABLE CONTROLLER

TECHNICAL FIELD

The present invention relates to a general-purpose functional circuit and a general-purpose unit for a programmable controller for performing sequence control of an external appliance on the basis of a sequence program.

BACKGROUND ART

A known programmable controller comprises a CPU unit including a CPU operating in accordance with a sequence program, a high function unit having a special function upgraded for assisting the CPU unit, a power source unit for supplying electric power to the CPU unit and the high function unit and a back plane for mounting the above units thereon. The high function unit includes, for example, an input/output unit having an input/output function for inputting and outputting signals between the external appliance and the CPU unit as well as an input time constant function for eliminating noises of an input signal, an interruption unit having an interruption function for starting execution of an interruption program in response to an external input, a counter unit having a counter function for counting external clocks, a comparison and output function for outputting a proper signal by comparing a count value with a target value and a pulse width modulation (PWM) output function for outputting a PWM signal, a pulse output unit having a pulse output function for outputting a pulse signal of a preset frequency and a positioning unit having a positioning function for performing positioning control of the external appliance on the basis of a command of the CPU unit.

Conventionally, in case the above mentioned high function units having the special functions are developed, the high function units are produced individually by performing circuit design for each of the high function units even when the high function units have similar functions partially, thereby resulting in such disadvantages that period and cost for their development and commercialization increase and their production control becomes troublesome due to difficulty in common use of their components.

Meanwhile, the high function unit needs to form communication with other units including the CPU unit and thus, is usually mounted with a CPU or a gate array. In a high function unit employing a CPU in its circuit, function of the high function unit can be changed by rewriting a program even after its production. However, its throughput speed drops and particularly, parallel processing of a plurality of functions is difficult. Furthermore, in a high function unit employing a gate array in its circuit, its throughput speed is high but its functions cannot be changed after its production. The high function unit having the gate array is inexpensive at present but a considerable time is required for providing the gate array in the circuit after its circuit design. In addition, in case a plurality of functions are imparted to the high function unit employing the gate array, all the functions and their specifications should be determined at the stage of production because the functions cannot be changed after its production.

DISCLOSURE OF INVENTION

The present invention has for its object to provide, with a view to eliminating the above mentioned drawbacks of prior art, a general-purpose functional circuit and a general-purpose unit for a programmable controller, in which a plurality of functions of high function units of the programmable controller can be gained easily and production cost can be lowered through common use of circuit components.

In order to accomplish this object of the present invention, a general-purpose functional circuit for a programmable controller, according to the present invention comprises: an external connector which is connected to an external appliance to be controlled; an interconnecting connector which is connected to at least a CPU unit of the programmable controller; and an arithmetic processing means which has at least a function of transmitting to and receiving from the external appliance connected to the arithmetic processing means through the external connector, signals and performing a logical operation based on an external signal received from the external appliance so as to transmit to the CPU unit via the interconnecting connector, a logical operation signal corresponding to a result of the logical operation; wherein the CPU unit includes a CPU for executing a sequence program.

BEST MODE FOR CARRYING OUT THE INVENTION

Hereinafter, embodiments of the present invention are described with reference to the drawings.

(First Embodiment)

Figure 1:
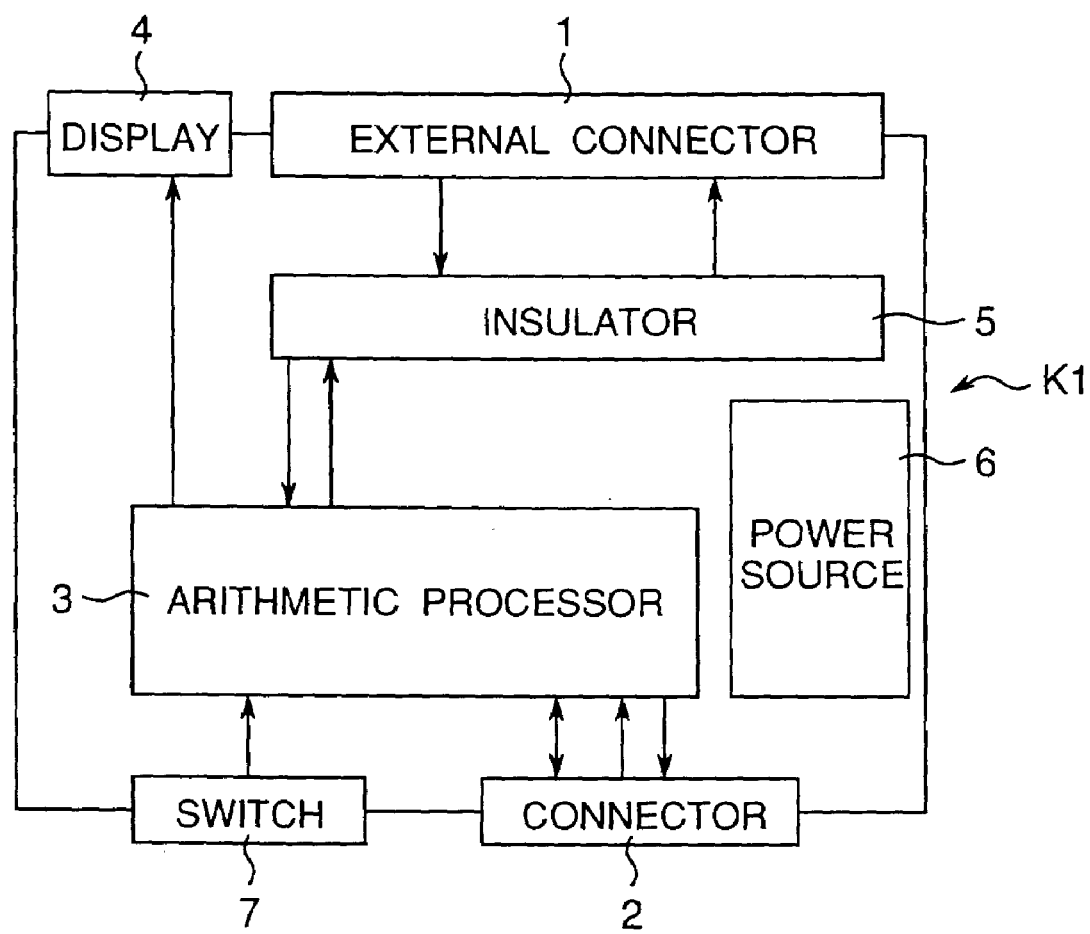
FIG. 1 is a block diagram of a general-purpose functional circuit for a programmable controller, according to a first embodiment of the present invention.
Figure 2:
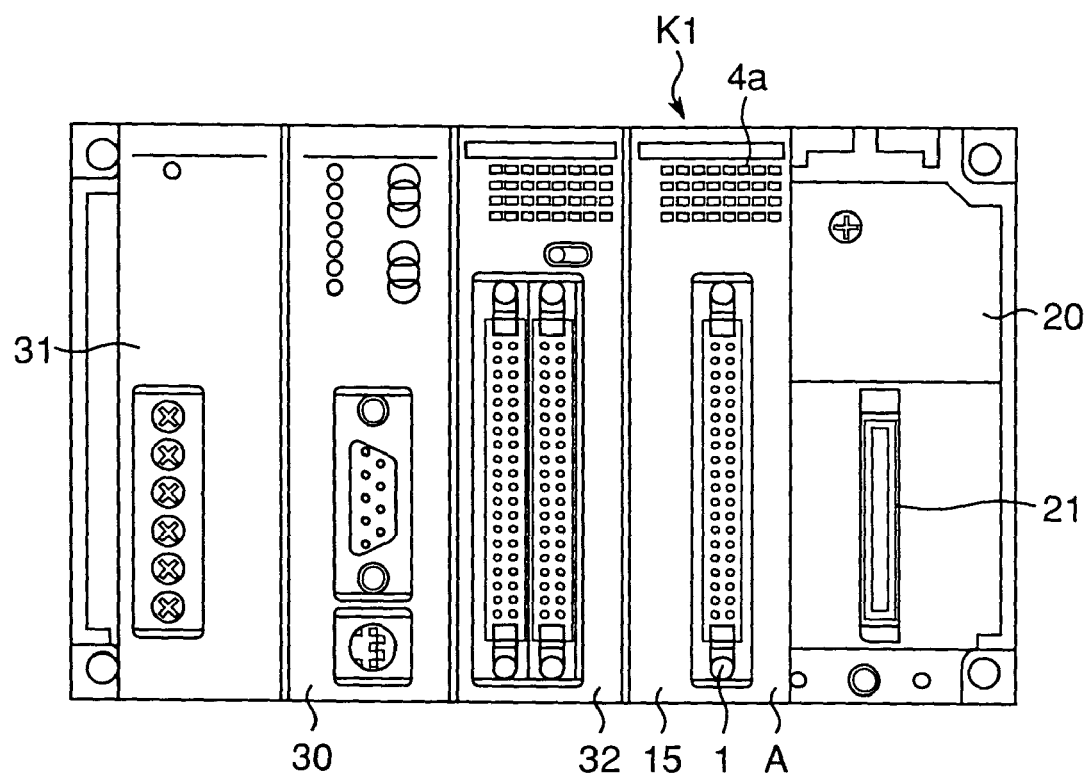
FIG. 2 is a front elevational view of the programmable controller of FIG. 1.

FIG. 1 shows a general-purpose functional circuit K1 for a programmable controller, according to a first embodiment of the present invention and FIG. 2 shows the programmable controller of FIG. 1. As shown in FIG. 1, the general-purpose functional circuit K1 includes an external connector 1, an interconnecting connector 2, an arithmetic processor 3, a display 4, an insulator 5, a power source 6 and a setting switch 7.

The external connector 1 is provided for connecting the general-purpose functional circuit K1 to an external appliance subjected to sequence control. The external appliance includes an appliance, a tool, etc. For example, a connector conforming to Military Standards (MIL), i.e., a so-called MIL connector is used as the external connector 1. The insulator 5 is connected to the external connector 1 and the arithmetic processor 3 and is formed by, for example, a plurality of optical isolators so as to insulate input/output signals transmitted between and received by the arithmetic processor 3 and the external appliance via the external connector 1. Meanwhile, in case a high-speed optical isolator requiring a power source is used, a power source circuit for supplying electric power to the optical isolator from an external power source may be provided additionally.

The interconnecting connector 2 is connected to the arithmetic processor 3 and is connected to a connector 21 provided in a back plane 20 of the programmable controller as will be described later. The arithmetic processor 3 communicates with other units, e.g., a CPU unit 30 of the programmable controller by way of this interconnecting connector 2. The CPU unit 30 includes a CPU for executing a sequence program.

The display 4 is formed by a plurality of light emitting diodes (LEDs) and displays, on the basis of control signals and display data given from the arithmetic processor 3, an operational state of the general-purpose functional circuit K1, for example, ON state or OFF state of the input/output signals from and to the external appliance connected to the external connector 1 and states of functional signals generated in the general-purpose functional circuit K1. The setting switch 7 is provided for setting an operational state of the arithmetic processor 3 and is formed by, for example, a 2-bit dual inline package (DIP) switch. Thus, the arithmetic processor 3 reads a setting state of the setting switch 7 and operates on the basis of the setting state. By converting, for example, a DC voltage of 5V received from a power source unit 31 of the back plane 20 through the interconnecting connector 2 into a necessary DC voltage of 3.3V, the power source 6 supplies the DC voltage of 3.3V to each component of the general-purpose functional circuit K1.

The arithmetic processor 3 has a function of transmitting to and receiving from the external appliance connected to the arithmetic processor 3 through the external connector 1, signals and performing a logical operation based on a signal received from the external appliance so as to transmit to the CPU unit 30, etc. of the programmable controller via the interconnecting connector 2, a signal corresponding to a result of the logical operation and a function of performing a logical operation based on a signal received from the CPU unit 30 via the interconnecting connector 2 so as to transmit to the external appliance through the external connector 1, a signal corresponding to a result of the logical operation.

In this embodiment, the arithmetic processor 3 is formed by a programmable logic device (PLD) capable of performing a logical operation by programming a predetermined function, for example, a field programmable gate array (FPGA) and a complex programmable logic device (CPLD). Generally, the PLD is provided with a so-called Joint Test Action Group (JTAG) port and a program in the PLD is rewritable by using the JTAG port even after the PLD has been mounted on a printed board.

When the general-purpose functional circuit K1 of the above described configurations is accommodated in a box-like housing 15 made of synthetic resin, a general-purpose unit A is obtained as shown in FIG. 2. The external connector 1 is provided at a substantially central portion of a front face of the housing 15 so as to be exposed forwardly and a display face 4a of the display 4 is provided at an upper portion of the front face of the housing 15. Although not specifically shown, the setting switch 7 and the interconnecting connector 2 are provided on a rear face of the housing 15 so as to be exposed rearwardly. By connecting the interconnecting connector 2 to the connector 21 of the back plane 20, the general-purpose unit A is mounted on the back plane 20. Thus, by mounting on the back plane 20, the power source unit 31 for supplying electric power to the CPU unit 30 and other units, a functional unit 32 having an input/output function of inputting and outputting signals from and to outside, for example, an input/output unit for inputting and outputting signals from and to the external appliance, etc., the programmable controller is obtained.

Meanwhile, in addition to the input/output function referred to above, the functional unit 32 has various functions such as an input time constant function, an interruption function, a counter function, a comparison and output function, a pulse output function, a pulse width modulation (PWM) output function and a positioning function. Units having such functions, namely, the input/output unit, an input time constant unit, an interruption unit, a counter unit, a comparison and output unit, a pulse output unit, a PWM output unit and a positioning unit are already commercially available. Since configurations and operations of these units are known, the description is abbreviated for the sake of brevity.

In the general-purpose functional circuit K1 of the present invention, since the arithmetic processor 3 which performs the above mentioned various functions is formed by the PLD in which a program is rewritable easily and a throughput speed is higher than that of a CPU, the various functions such as the input/output function, the input time constant function, the interruption function, the counter function, the comparison and output function, the pulse output function, the PWM output function and the positioning function can be achieved in the single general-purpose functional circuit K1 by rewriting the program. Thus, since circuit configurations of a plurality of kinds of the functional units 32 can be made common with each other, circuit components can be made common with each other, so that production control is facilitated, thereby resulting in reduction of production cost and inventory.

Meanwhile, when the insulator 5 is formed by high-speed optical isolators so as to enable high-speed and multipoint input and output between the external appliance and the arithmetic processor 3, the various functional units such as the input/output unit, the interruption unit, the counter unit, the pulse output unit, the PWM output unit and the positioning unit can be produced by merely changing the program in the PLD in a single circuit configuration so far as the number of input/output points and speed of response of the insulator 5 permit. By providing the general-purpose unit A usable for a plurality of the functional units in common, the number of kinds of the functional units can be reduced and thus, production control of the functional units is facilitated advantageously. Moreover, since the various functional units can be produced by merely using the circuit configuration in common and changing the program, it is possible to meet demands for functional change and development of a new product at low cost in a short period of time. Furthermore, even in case a communication method for connecting the general-purpose functional unit K1 to other units will be changed or replaced by a new one in future, it is possible to cope with such future situations within restrictions of wiring to the interconnecting connector 2 by merely changing the program in the PLD without the need for changing the circuit configuration.

Meanwhile, on the part of an end user, functional units laid away as spare parts for maintenance in the case of failures of the facility, etc. can be incorporated into the general-purpose unit A and thus, can be controlled easily. Namely, it has been so far necessary to prepare and control the functional units in the number equal to that of kinds of the functional units provided in the facility. On the other hand, in the general-purpose unit A of the present invention, since the number of the identical functional units hitherto used separately may be one, control of the functional units is facilitated. Furthermore, so far, since the interruption unit, the counter unit, the pulse output unit, etc. have been mounted on the back plane 20 separately, the back plane 20 should have space for mounting these units on the back plane 20, i.e., slots. However, in the general-purpose unit A of the present invention, only one slot may be required to be provided on the back plane 20 in order to achieve the various functions, thereby resulting in saving of space.

(Second Embodiment)

In case the arithmetic processor 3 should be formed by a large-scale and inexpensive PLD, a volatile PLD is dominantly available at present. However, the program should be downloaded to the volatile PLD each time the power source 6 is turned on. Hence, intended operation cannot be performed until this downloading is completed normally. In order to solve this problem, a general-purpose functional circuit K2 for a programmable controller, according to a second embodiment of the present invention has the following configurations.

Figure 3:
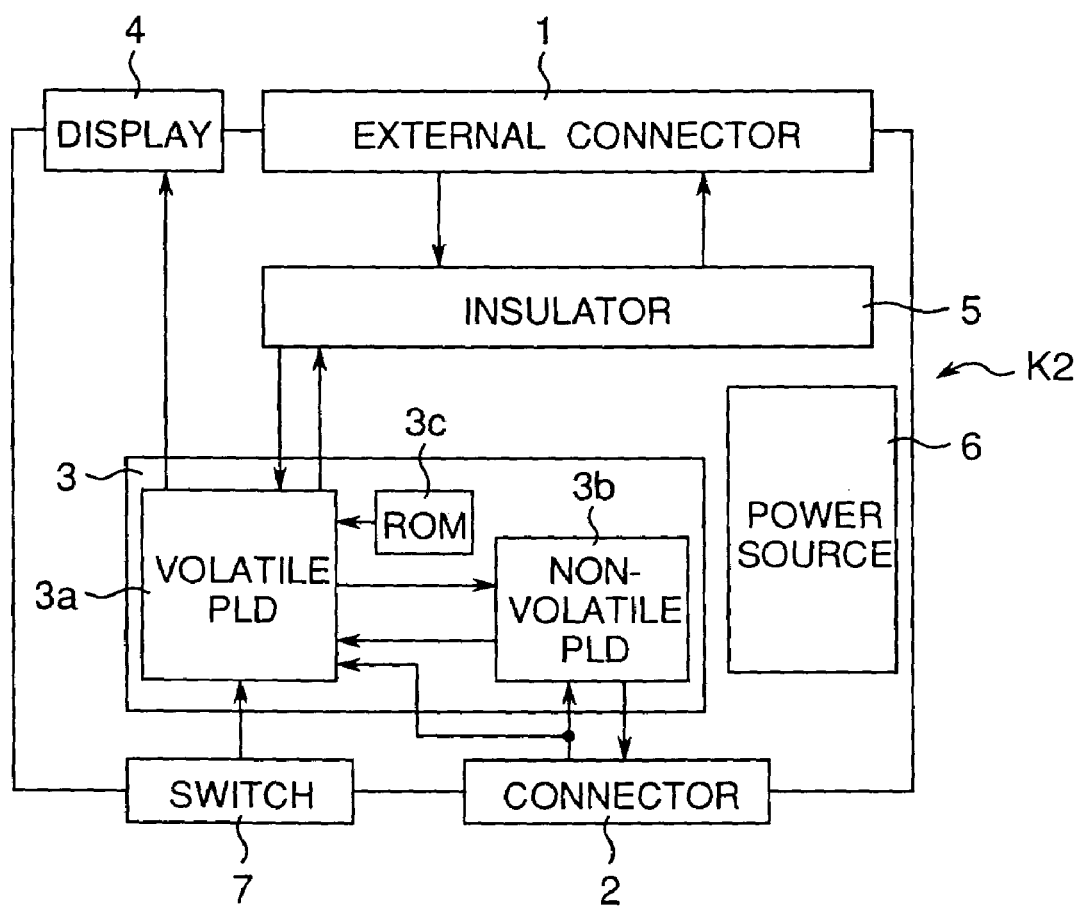
FIG. 3 is a block diagram of a general-purpose functional circuit for a programmable controller, according to a second embodiment of the present invention.

As shown in FIG. 3, the arithmetic processor 3 is formed by a volatile PLD 3a, a nonvolatile PLD 3b and a read-only memory (ROM) 3c for storing the program downloaded to the volatile PLD 3a at the time of turning on of the power source 6. Since other configurations of the general-purpose functional circuit K2 are similar to those of the general-purpose functional circuit K1, the description is abbreviated for the sake of brevity.

The volatile PLD 3a is formed by, for example, a static random access memory (SRAM)-based field programmable gate array (FPGA) and operates on the basis of the program downloaded from the ROM 3c. By changing the program stored in the ROM 3c, the volatile PLD 3a is capable of performing the various functions such as the input/output function, the input time constant function, the interruption function, the counter function, the comparison and output function, the pulse output function, the PWM output function and the positioning function. Meanwhile, the nonvolatile PLD 3b is formed by, for example, a flash ROM (FROM)-based complex programmable logic device (CPLD) or an electrically erasable and programmable ROM (EEPROM)-based CPLD and detects a malfunction of downloading of the program to the volatile PLD 3a at the time of turning on of the power source 6 so as to inform other units such as the CPU unit 30 of the malfunction.

Then, operation of the general-purpose functional circuit K2 is described in which the nonvolatile PLD 3b detects the malfunction of downloading of the program to the volatile PLD 3a at the time of turning on of the power source 6. The nonvolatile PLD 3b compares a check bit added to the program data downloaded to the volatile PLD 3a from the ROM 3c and a checksum result of the program data received from the volatile PLD 3a. When the check bit is coincident with the checksum result, the nonvolatile PLD judges that the malfunction does not occur. On the contrary, when the check bit is not coincident with the checksum result, the nonvolatile PLD 3b judges that the malfunction occurs. Furthermore, when the nonvolatile PLD 3b has judged that the malfunction does not occur and occurs, the nonvolatile PLD 3b sets to a high level and a low level, respectively a predetermined output port connected to the interconnecting connector 2. Only when the nonvolatile PLD 3b has judged that the malfunction occurs, the nonvolatile PLD 3b latches an output of the output port at a timing of an initial access by other units via the interconnecting connector 2. As a result, only when the malfunction has occurred in the downloading and an inquiry on state of the general-purpose functional circuit K2 has been made by other units, the nonvolatile PLD 3b informs other units of the malfunction. Meanwhile, when the downloading has been completed normally, the volatile PLD 3a communicates with other units.

In this embodiment, without providing a CPU in the arithmetic processor 3, the nonvolatile PLD 3b can detect the malfunction of downloading of the program to the volatile PLD 3a at the time of turning on of the power source 6 and inform other units of the malfunction. Therefore, a large-scale gate can be used as the volatile PLD 3a advantageously.

Meanwhile, supposing that a supply voltage and a signal voltage, which are inputted to the general-purpose functional circuit K2 from the back plane 20 through the interconnecting connector 2, are 5V, an operating voltage of 3.3V is used for the volatile PLD 3a and an operating voltage of 5V is used for the nonvolatile PLD 3b, the voltage of 3.3V used for internal processing and the voltage of 5V used for communication with other units are different from each other. In such a case, it is generally necessary to employ a bidirectional interface IC between two power sources, thus resulting in increase of the number of components.

However, in this embodiment, a device operable on at least two voltages including the voltage of 3.3V used for arithmetic processing and the voltage of 5V used for transmission between the device and the units via the interconnecting connector 2 is employed as the nonvolatile PLD 3b.

Then, in the general-purpose functional circuit K2, a method of communication between the arithmetic processor 3 and other units is described. A signal inputted to the arithmetic processor 3 from other units by way of the interconnecting connector 2 is inputted to the nonvolatile PLD 3b and the volatile PLD 3a. This signal is, for example, an enable signal, an address, a read signal, a write signal and input data. Meanwhile, a signal which is produced in the volatile PLD 3a and is outputted to other units through the interconnecting connector 2, for example, output data is outputted via the nonvolatile PLD 3b. This output data is controlled on the basis of a control signal delivered from the volatile PLD 3a. In this way, the nonvolatile PLD 3b converts an output of the volatile PLD 3a having the operating voltage of 3.3V into a signal of 5V and then, outputs the signal of 5V to other units. Therefore, even if the processing voltage of 3.3V and the voltage of 5V for communication between the arithmetic processor 3 and other units are different from each other in the general-purpose functional circuit K2, communication between the arithmetic processor 3 and other units can be performed. Accordingly, since such components as the bidirectional interface IC between two power sources are not required to be provided, the general-purpose functional circuit K2 and the general-purpose unit A can be made compact and inexpensive. Meanwhile, since a device operable on a low voltage of, for example, 3.3V can be used in the general-purpose functional circuit K2, the large-scale volatile PLD 3a readily available at low voltage can be mounted, thus resulting in reduction of power consumption and radiant noise.

(Third Embodiment)

Figure 4:
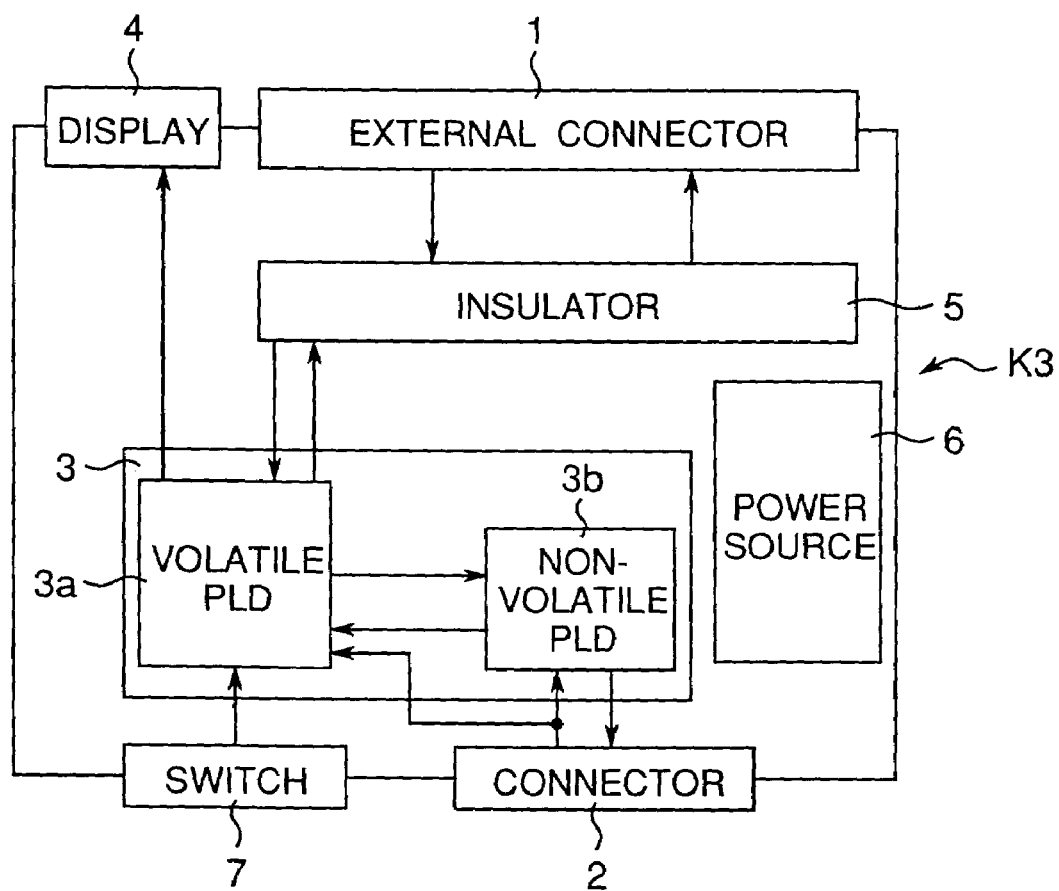
FIG. 4 is a block diagram of a general-purpose functional circuit for a programmable controller, according to a third embodiment of the present invention.

FIG. 4 shows a general-purpose functional circuit K3 for a programmable controller, according to a third embodiment of the present invention. The general-purpose functional circuit K3 is characterized in that program data is downloaded to the volatile memory 3a of the arithmetic processor 3 from other units such as the CPU unit 30 via the interconnecting connector 3 at the time of turning on of the power source 6. Thus, the ROM 3c for storing the data to be downloaded in the general-purpose functional circuit K2 is not provided in the arithmetic processor 3 of the general-purpose functional circuit K3. Since other configurations of the general-purpose functional circuit K3 are similar to those of the general-purpose functional circuit K2, the description is abbreviated for the sake of brevity.

In this embodiment, the data to be downloaded to the volatile PLD 3a is stored in a memory of the CPU unit 30 and is downloaded to the volatile PLD 3a from the CPU unit 30 by way of the interconnecting connector 2 at the time of turning on of the power source 6. Meanwhile, a malfunction of the downloading is monitored by the nonvolatile PLD 3b in the same manner as the second embodiment.

Thus, by changing the program stored in the memory of the CPU unit 30, the general-purpose functional circuit K3 is capable of performing the various functions such as the input/output function, the input time constant function, the interruption function, the counter function, the comparison and output function, the pulse output function, the PWM output function and the positioning function. In order to store the program in the memory of the CPU unit 30, there is a method in which the program to be downloaded is selected on an upper host by using a dedicated application software and is transmitted to the CPU unit 30 together with a user program. Alternatively, a method may also be employed in which a plurality of kinds of programs for achieving the above mentioned various functions are stored in a World Wide Web (WWW) server or a File Transfer Protocol (FTP) server connected to the Internet and the desired program is temporarily downloaded to the above upper host from the server through the Internet so as to be transmitted to the CPU unit 30 together with the user program.

(Fourth Embodiment)

Figure 5:
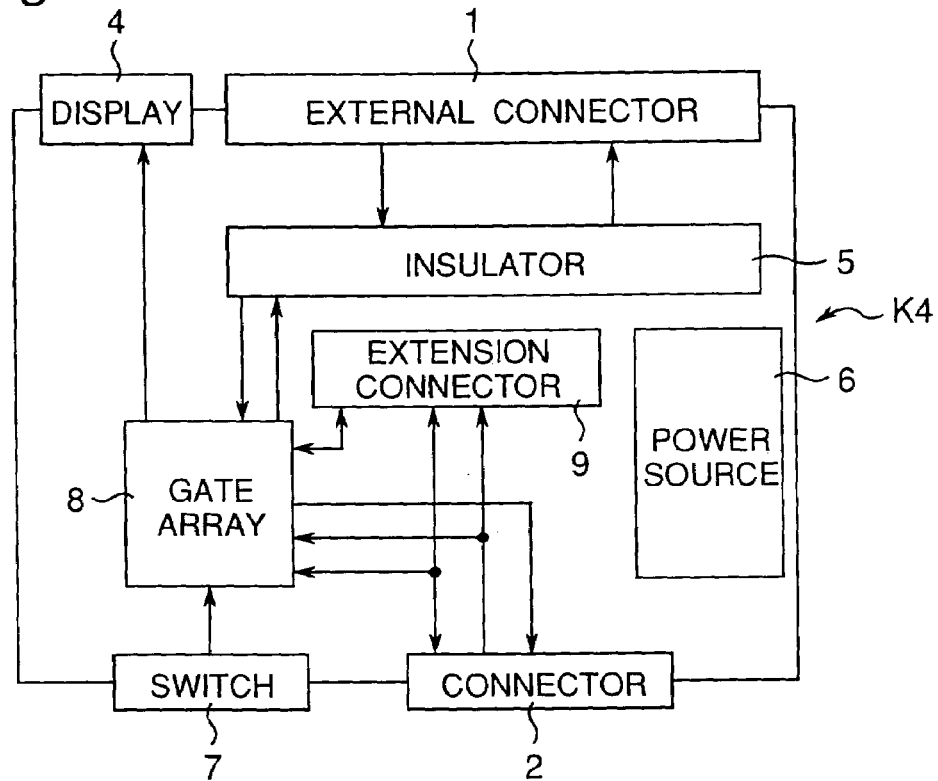
FIG. 5 is a block diagram of a general-purpose functional circuit for a programmable controller, according to a fourth embodiment of the present invention.

FIG. 5 shows a general-purpose functional circuit K4 for a programmable controller, according to a fourth embodiment of the present invention. The general-purpose functional circuit K4 includes a gate array 8 in place of the arithmetic processor 3 of the general-purpose functional circuit K1. A plurality of special functions upgraded for assisting the CPU unit 30 connected to the gate array 8 through the interconnecting connector 2 are incorporated into the gate array 8 and the gate array 8 transmits to and receive from the external appliance via the external connector 1, signals. The general-purpose functional circuit K4 further includes an extension substrate 40 (FIG. 6) and an extension connector 9 connected to the extension substrate 40. The extension substrate 40 is provided for adding a plurality of further special functions obtained by expanding the special functions incorporated into the gate array 8. Meanwhile, the gate array 8 includes an expansion bus for connecting the gate array 8 to the extension substrate 40 by way of the extension connector 9. Meanwhile, the external connector 1, the interconnecting connector 2, the display 4, the insulator 5, the power source 6, the setting switch 7, the gate array 8 and the extension connector 9 are mounted on a main circuit board formed by a single printed board. Since other configurations of the general-purpose functional circuit K4 are similar to those of the general-purpose functional circuit K1, the description is abbreviated for the sake of brevity.

In the same manner as the arithmetic processor 3 of the general-purpose functional circuit K1, the gate array 8 has a function of transmitting to and receiving from the external appliance connected to the gate array 8 through the external connector 1, signals and performing a logical operation based on a signal received from the external appliance so as to transmit to the CPU unit 30, etc. of the programmable controller via the interconnecting connector 2, a signal corresponding to a result of the logical operation and a function of performing a logical operation based on a signal received from the CPU unit 30 via the interconnecting connector 2 so as to transmit to the external appliance through the external connector 1, a signal corresponding to a result of the logical operation.

Meanwhile, a plurality of the special functions incorporated into the gate array 8 include the input/output function, the input time constant function, the interruption function, the counter function, the comparison and output function, the pulse output function, the PWM output function and the positioning function. In short, the single general-purpose functional circuit K4 can act as the input/output unit, the interruption unit, the counter unit, the pulse output unit and the positioning unit. Therefore, since the general-purpose functional circuit K4 may be mounted on the back plane 20 in place of a plurality of these high function units, space can be saved as compared with a case in which the input/output unit, the interruption unit, the counter unit, the pulse output unit and the positioning unit are mounted on the back plane 20.

Figure 6:
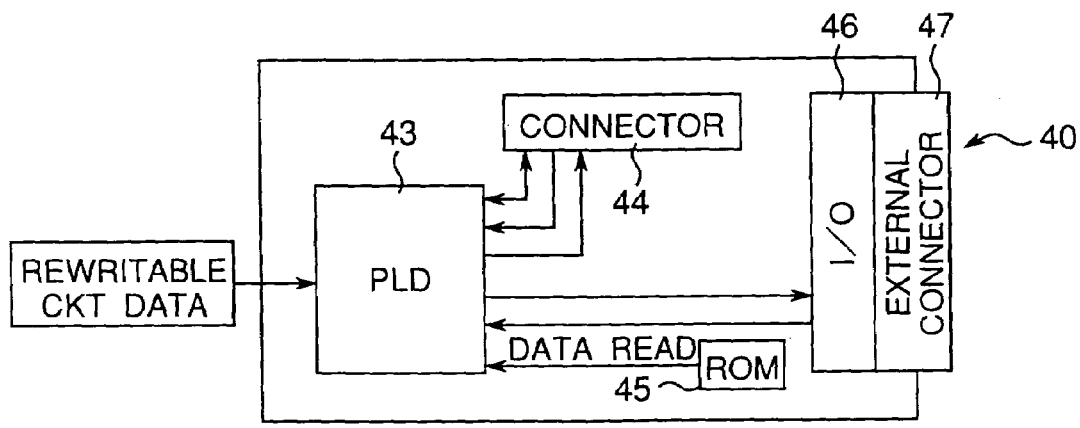
FIG. 6 is a block diagram of an extension substrate for the general-purpose functional circuit of FIG. 5.

As shown in FIG. 6, the extension substrate 40 includes a connector 44 connected to the extension connector 9 of the main circuit board, a programmable logic device (PLD) 43, a ROM 45 for storing a program for imparting the above mentioned additional special functions to the PLD 43, an external connector 47 connectable to the external appliance and an input/output module 46 provided between the external connector 47 and the PLD 43. The PLD 43 includes a so-called JTAG port and a program in the PLD 43 is rewritable by using the JTAG port even after the PLD 43 has been mounted on the extension substrate 40. Meanwhile, the input/output module 46 has a function of transmitting to the PLD 43, signals inputted via the external connector 47 and a function of transmitting signals from the PLD 43 to the external appliance connected to the external connector 47.

Therefore, in the general-purpose functional circuit K4, since a plurality of the special functions can be gained by the gate array 8, the components can be made common with each other, so that production control is facilitated, thereby resulting in reduction of production cost and inventory. Moreover, when the extension substrate 40 for adding the further special functions obtained by expanding the special functions incorporated into the gate array 8 is connected to the extension connector 9, the further special functions can be added. Hence, if it is necessary to add the further special functions, the further special functions can be added easily by properly connecting the extension substrate 40 to the extension connector 9 in accordance with user's specifications. Accordingly, it is only necessary to perform inventory control of the single general-purpose functional circuit K4 instead of inventory control of a plurality of the high function units.

Furthermore, since the additional special functions conforming to the user's specifications can be achieved in the PLD 43 provided on the extension substrate 40, it is possible to easily cope with change or increase of the additional special functions. In addition, since the extension substrate 40 is added by internal connection in the general-purpose functional circuit K4, it is possible to perform high-speed processing by imparting a new special function to the PLD 43 of the extension substrate 40. Meanwhile, since the extension substrate 40 is provided with the external connector 47 connected to the external appliance, the extension substrate 40 can be connected to the external appliance without using the insulator 5 therebetween and thus, the extension substrate 40 can directly communicate with the external appliance, thereby resulting in improvement of extensibility.

(Fifth Embodiment)

Figure 7:
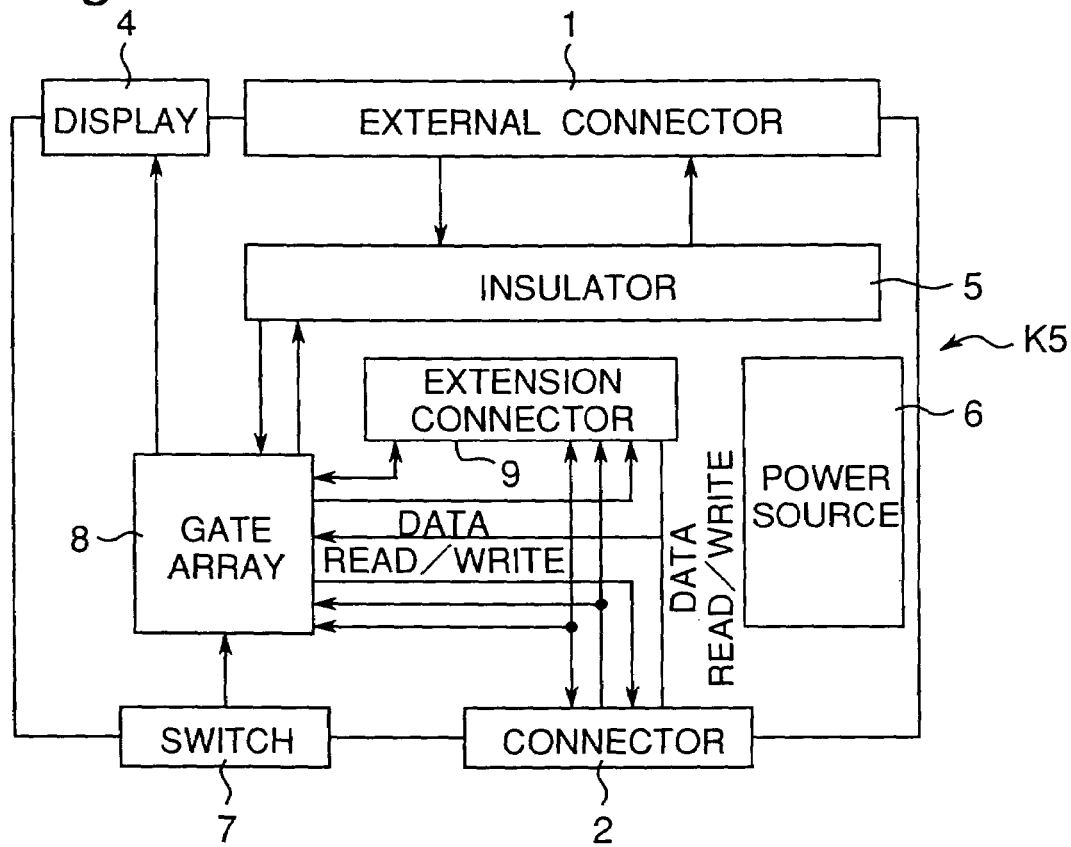
FIG. 7 is a block diagram of a general-purpose functional circuit for a programmable controller, according to a fifth embodiment of the present invention.
Figure 8:
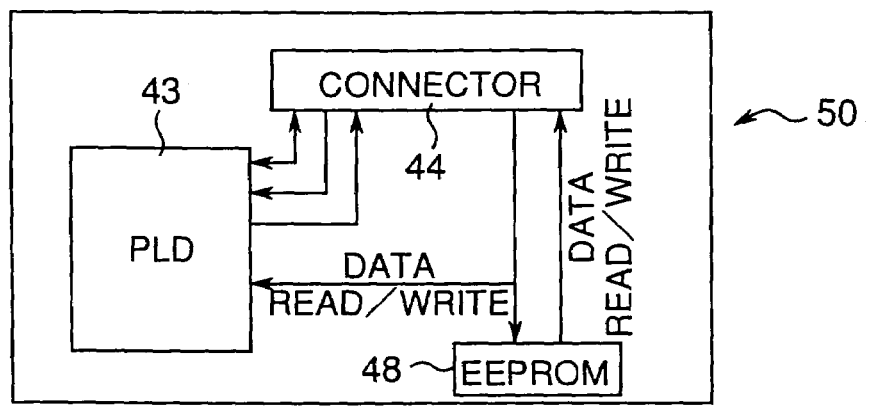
FIG. 8 is a block diagram of an extension substrate for the general-purpose functional circuit of FIG. 7.

FIG. 7 shows a general-purpose functional circuit K5 for a programmable controller, according to a fifth embodiment of the present invention. The general-purpose functional circuit K5 includes an extension substrate 50 shown in FIG. 8. The general-purpose functional circuit K5 is characterized in that in place of the ROM 45 of the extension substrate 40 of the general-purpose functional circuit K4, a rewritable nonvolatile memory 48 capable of downloading circuit data to the PLD 43 from outside is provided in the extension substrate 50. For example, an EEPROM is employed as the rewritable nonvolatile memory 48. The PLD 43 is capable of performing the additional special functions on the basis of the circuit data stored in the EEPROM 48. Since other configurations of the general-purpose functional circuit K5 are similar to those of the general-purpose functional circuit K4, the description is abbreviated for the sake of brevity.

Figure 9:
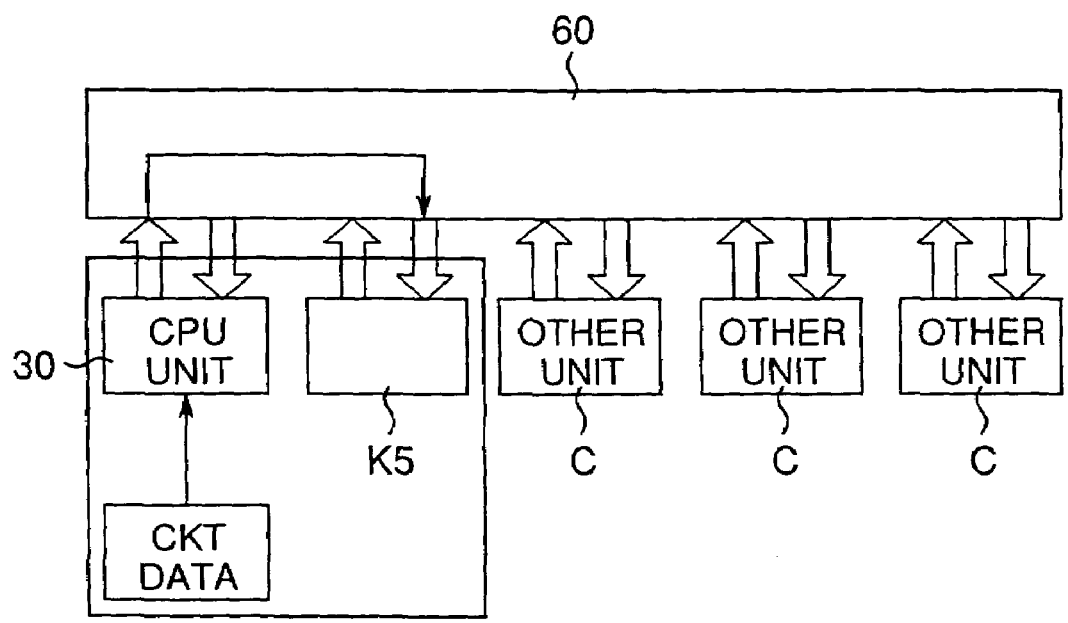
FIG. 9 is a view explanatory of a method of rewriting circuit data in the general-purpose functional circuit of FIG. 7.
Figure 10:
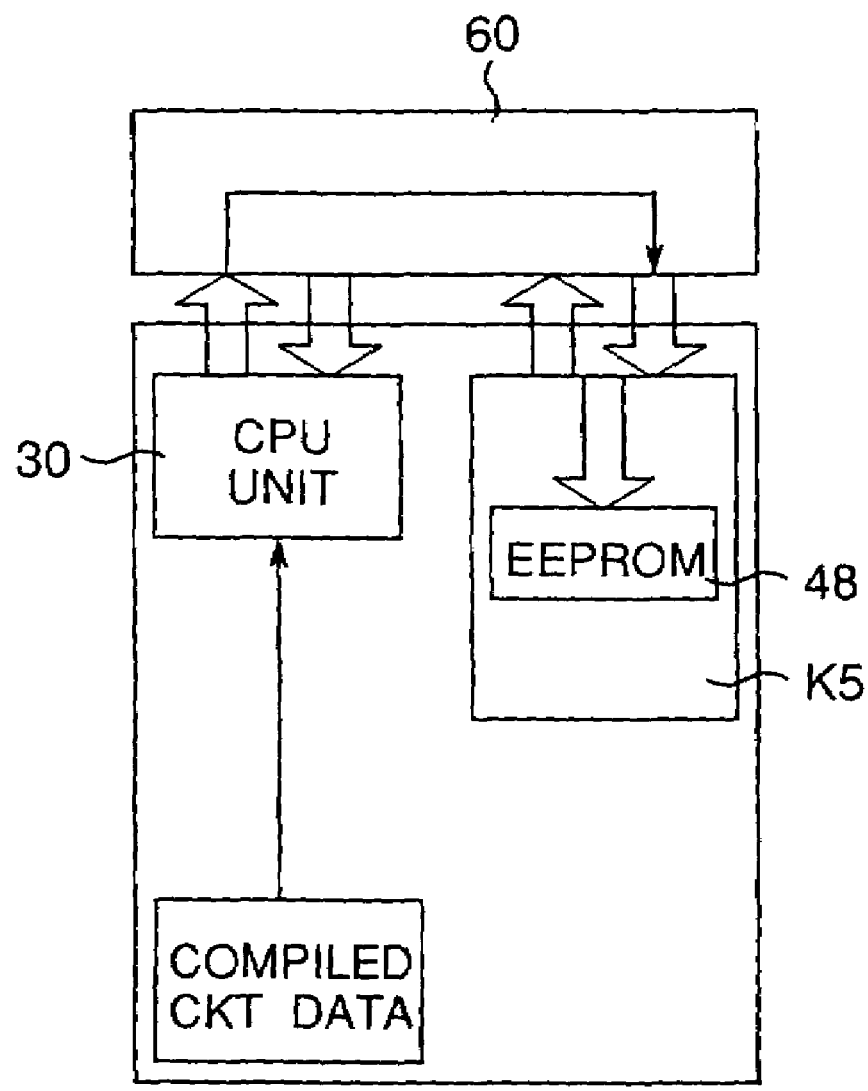
FIG. 10 is a fragmentary detail view of FIG. 9.

When the connector 44 of the extension substrate 50 is connected to the extension connector 9, compiled circuit data to be delivered to the PLD 43 can be downloaded to the EEPROM 48 through a tool coupling port (not shown) of the CPU unit 30 and a mother bus 60 as shown in FIGS. 9 and 10. Meanwhile, in FIG. 9, other units C represent a power source unit and other high function units.

In this embodiment, since the additional special functions conforming to user's specifications can be provided as application software, an inexpensive PLD in which the number of gates is relatively small can be used as the PLD 43, thus resulting in drop of production cost. Meanwhile, in the fourth embodiment, in case the additional special functions are changed, the ROM 45 should be replaced. On the other hand, in this embodiment, in such a case, the EEPROM 48 is not required to be replaced, thereby resulting in reduction of production cost.

Meanwhile, in the case where a plurality of independent circuit data are stored in the EEPROM 48, the EEPROM 48 selectively gives one of a plurality of the circuit data to the PLD 43 in accordance with contents of the sequence program during execution of the sequence program. Therefore, since the circuit data of the PLD 43 can be rewritten even during execution of the sequence program, a plurality of the special functions can be gained even in a PLD in which the number of gates is relatively small.

(Sixth Embodiment)

Figure 11:
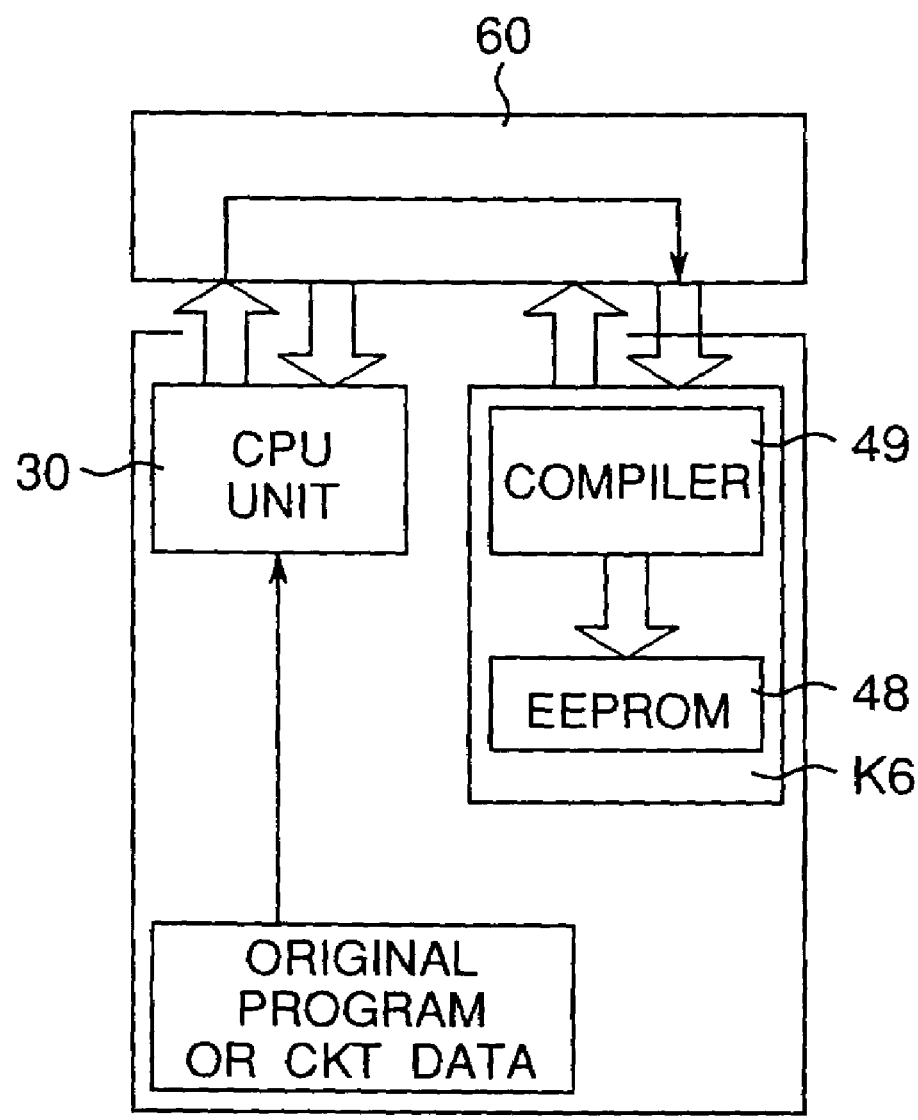
FIG. 11 is a view similar to FIG. 10, particularly showing a sixth embodiment of the present invention.

FIG. 11 shows a general-purpose functional circuit K6 for a programmable controller, according to a sixth embodiment of the present invention. The general-purpose functional circuit K6 is characterized in that a compiler (compiling system) 49 for compiling, when a source program or circuit data is downloaded to the EEPROM 48, the source program or the circuit data into circuit data enabling operation of the PLD 43, is provided in the gate array 8. Such a compiling system is available from makers of programmable logic devices. Since other configurations of the general-purpose functional circuit K6 are similar to those of the general-purpose functional circuit K5, the description is abbreviated for the sake of brevity.

In this embodiment, when a source program (original program) made up of circuit data or a user program such as ladder used generally in the programmable controller is downloaded to the EEPROM 48 through the CPU unit 30 and the mother bus 60, the source program is automatically compiled by the compiler 49 into circuit data enabling operation of the PLD 43 and is stored in the EEPROM 48. Thus, a new special function can be added by formulating the user program or the circuit data. Therefore, the user can impart to the PLD 43, special functions corresponding to applications.

In the foregoing description of the programmable connector, the various units including the general-purpose unit are mounted on the back plane. However, the present invention can be applied also to a type in which the various units are directly connected to one another without using the back plane and a type in which the programmable controller is connected to an extension unit by a cable.

The invention claimed is:

1. A general-purpose functional circuit for a programmable controller, comprising:
   an external connector which is configured to connect to an external appliance to be controlled;
   an interconnecting connector which is configured to connect to a CPU unit of the programmable controller; and
   an arithmetic processor which transmits signals to and receives signals from the external appliance through the external connector, and performs a logical operation based on an external signal received from the external appliance so as to transmit to the CPU unit via the interconnecting connector a logical operation signal corresponding to a result of the logical operation, said arithmetic processor comprising:
      a volatile programmable logic device (PLD); and
      a non-volatile PLD that detects a malfunction in downloading data to the volatile PLD,
   wherein the CPU unit includes a CPU that executes a sequence program.

2. A general-purpose functional circuit according to claim 1, wherein the functions of the programmable controller are selected by rewriting a program in the volatile PLD.

3. A general-purpose functional circuit according to 1, wherein the nonvolatile PLD notifies the CPU unit of the malfunction in downloading data via the interconnecting connector.

4. A general-purpose functional circuit according to claim 1, wherein the nonvolatile PLD operates on at least two voltages, including a first voltage used for arithmetic processing and a second voltage used for transmission between the nonvolatile PLD and the CPU unit through the interconnecting connector.

5. A general-purpose unit for a programmable controller, comprising:
   an external connector which is configured to connect to an external appliance to be controlled;
   an interconnecting connector which is configured to connect to a CPU unit of the programmable controller;

an arithmetic processor which transmits signals to and receives signals from the external appliance through the external connector, and performs a logical operation based on an external signal received from the external appliance so as to transmit to the CPU unit via the interconnecting connector a logical operation signal corresponding to a result of the logical operation, said arithmetic processor comprising:
a volatile programmable logic device (PLD); and
a non-volatile PLD that detects a malfunction in downloading data to the volatile PLD; and
a housing which accommodates the arithmetic processor and having an outer surface, the external connector and the interconnecting connector being provided on the outer surface so as to be exposed,
wherein the CPU unit includes a CPU that executes a sequence program.

6. A general-purpose unit according to claim 5, wherein the functions of the programmable controller are selected by rewriting a program in the volatile PLD.

7. A general-purpose unit according to claim 5, wherein the nonvolatile PLD notifies the CPU unit of the malfunction in downloading data via the interconnecting connector.

8. A general-purpose unit according to claim 5, wherein the nonvolatile PLD operates on at least two voltages, including a first voltage used for arithmetic processing and a second voltage used for transmission between the nonvolatile PLD and the CPU unit through the interconnecting connector.

9. A general-purpose functional circuit for a programmable controller, comprising:
an external connector which is configured to connect to an external appliance to be controlled;
an interconnecting connector which is configured to connect to a CPU unit of the programmable controller;
an arithmetic processor which transmits signals to and receives signals from the external appliance through the external connector, and performs a logical operation based on an external signal received from the external appliance so as to transmit to the CPU unit via the interconnecting connector a logical operation signal corresponding to a result of the logical operation, said arithmetic processor comprising a gate array having a plurality of special functions;
an extension substrate for expanding the special functions with additional special functions; and
an extension connector which is connected to the extension substrate,
wherein the CPU unit includes a CPU that executes a sequence program.

10. A general-purpose functional circuit according to claim 9, wherein the extension substrate includes a programmable logic device having the additional special functions and a connector connected to the programmable logic device and the extension connector.

11. A general-purpose functional circuit according to claim 10, wherein the extension substrate includes a rewritable nonvolatile memory configured to download circuit data to the programmable logic device.

12. A general-purpose functional circuit according to claim 11, wherein a plurality of independent circuit data is stored in the rewritable nonvolatile memory and the rewritable nonvolatile memory selectively provides some of the plurality of circuit data to the programmable logic device in accordance with contents of the sequence program during execution of the sequence program.

13. A general-purpose functional circuit according to claim 9, wherein the extension substrate includes an extension external connector connected to the external appliance.

14. A general-purpose functional circuit according to claim 11, wherein the gate array comprises a compiler that compiles at least one of a source program and additional circuit data into compiled circuit data when the source program or additional circuit data is downloaded to the programmable logic device, the compiled circuit data enabling operation of the programmable logic device.

* * * * *